Figure 1:
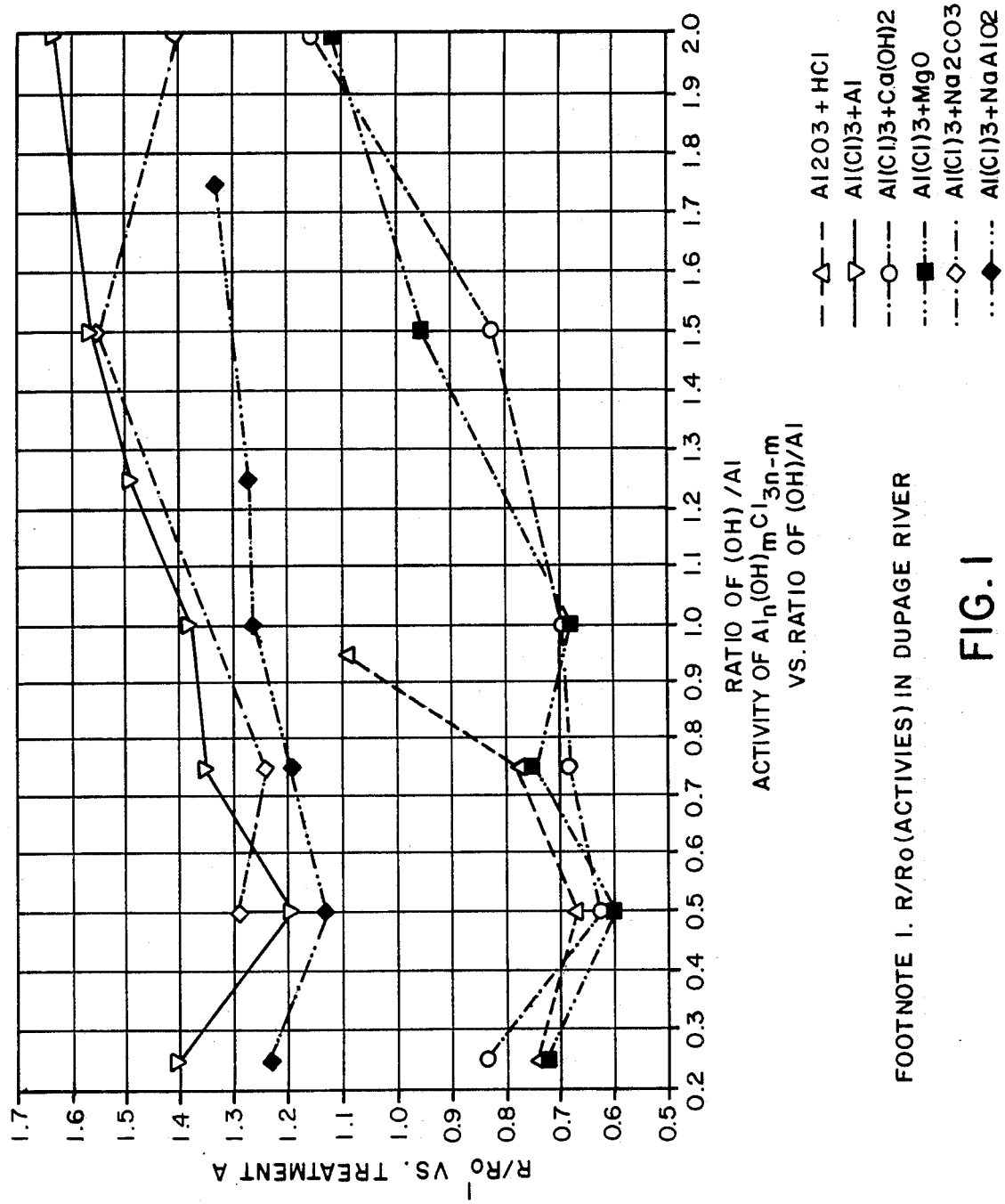

United States Patent [19]

Rose et al.

[11] Patent Number: 4,655,934

[45] Date of Patent: Apr. 7, 1987

[54] DIMERIC ALUMINUM COMPOUNDS AND THEIR USE

[75] Inventors: Gerard R. Rose, Park Ridge; John R. Hurlock, Hickory Hills, both of Ill.

[73] Assignee: Nalco Chemical Company, Oak Brook, Ill.

[21] Appl. No.: 775,452

[22] Filed: Sep. 12, 1985

[51] Int. Cl.⁴ .............................................. C02F 1/56
[52] U.S. Cl. .................... 210/728; 210/734; 210/736; 252/175; 252/181; 423/629
[58] Field of Search .............. 210/702, 716, 717, 725, 210/727, 728, 734, 736; 252/175, 181; 423/462, 463, 629

[56] References Cited

U.S. PATENT DOCUMENTS

| | | | |
|---|---|---|---|
| 2,312,198 | 2/1943 | Slagle | 210/702 |
| 3,270,001 | 8/1966 | Morimoto | 530/506 |
| 3,409,547 | 11/1968 | Dajani | 210/735 |
| 3,497,459 | 2/1970 | Nakamura et al. | 252/317 |
| 3,544,476 | 12/1970 | Aiba et al. | 252/175 |
| 3,738,945 | 6/1973 | Panzer et al. | 210/736 |
| 3,833,718 | 9/1974 | Reed et al. | 423/629 |
| 3,929,666 | 12/1975 | Aiba et al. | 252/317 |
| 3,953,330 | 4/1976 | Tonkyn et al. | 210/736 |
| 4,034,067 | 7/1977 | Seigneurin et al. | 423/462 |
| 4,051,028 | 9/1977 | Fiessinger | 210/716 |
| 4,131,545 | 12/1978 | Redmayne et al. | 210/716 |
| 4,238,347 | 12/1980 | Gancy et al. | 252/175 |
| 4,362,643 | 12/1982 | Kuo et al. | 210/716 |
| 4,390,445 | 6/1983 | Gytel | 423/462 |
| 4,417,996 | 11/1983 | Kuo et al. | 252/175 |
| 4,450,092 | 5/1984 | Huang | 210/725 |

Primary Examiner—Peter Hruskoci
Attorney, Agent, or Firm—John G. Premo; Donald G. Epple

[57] ABSTRACT

A method of clarifying waters having an alkalinity of at least 100 ppm, calculated as $CaCO_3$, which comprises:

a. adding thereto, to form a treated water, an effective amount for the purpose of clarifying said waters of a low-basicity polynuclear aluminum species having the formula:

$$Al_n(OH)_m Z_{3n-m}$$

wherein, n is at least 1.0
Z is a halide chosen from the group chloride, bromide, iodide, and mixtures thereof, and
wherein the ratio of m/n ranges between about 0.25 to about 1.0 and at least 25 mole percent of the polynuclear aluminum species above has n equal to 2.0, and then, b. allowing sufficient time to form and build a floc dispersed in the treated water, which floc contains turbidity causing components, and then, c. phase separating the floc from the treated waters to obtain clarified water.

9 Claims, 5 Drawing Figures

DIMERIC ALUMINUM COMPOUNDS AND THEIR USE

INTRODUCTION

Many teachings exist in the use of polynuclear aluminum compounds to treat waste waters to flocculate and/or coagulate suspended matter and therefore allowing these suspended materials to be removed from these waste waters and allowing one to obtain clarified waters through this treatment.

The prior art is resplendent with various patent applications which teach the use of these polynuclear aluminum compounds to clarify both municipal and industrial waste waters, various industrial feed waters, waters containing paint pigment dispersions, sewage waters, sewage sludges, natural waters, and the like. The general emphasis of the prior art in summary is the addition of these polynuclear aluminum species wherein the molecular weight of the polyaluminum species has been maximized and the polynuclear aluminum species has a high basicity.

We have determined surprisingly that waters containing relatively high alkalinity values, as measured in terms of ppm calcium carbonate, can be most effectively treated by the addition of a polynuclear aluminum species, particularly a polyaluminum chloride species, which is a low-basicity species, and which has a relatively low molecular weight. In fact, optimal results are obtained when these high alkalinity waters are treated with a polynuclear aluminum species wherein the concentration of a dimeric aluminum compound is maximized in the treating solution. Careful control of the basicity and the ratio of hydroxide to aluminum in such a polynuclear aluminum species achieves these results. Since polynuclear aluminum species are all in equilibrium, one with the other, this careful control of the ratio of hydroxyl to aluminum species is required to achieve the results desired in this invention.

PRIOR PUBLICATIONS

Below is presented a table of prior patents published in the United States which applicant considers material to the question of patentability of the claims attached hereto. Although the basicity ranges of some of the polynuclear aluminum species taught in these patents overlap the low basicity of the preferred species used in this invention, applicant does not believe that the use of such low basicity polynuclear aluminum compounds to clarify low turbidity waters having an alkalinity of at least 100 ppm, calculated as $CaCO_3$, is anticipated by any of these disclosures.

TABLE OF PRIOR U.S. PATENTS

| U.S. Pat. No. | Year Issued | Assignee | Basicity Range |
|---|---|---|---|
| 2,312,198 | 1943 | Res. Corp. | 33% |
| 3,270,001 | 1966 | Taki | 33%–100% |
| 3,497,459 | 1970 | Taki | 33%–75% |
| 3,544,476 | 1970 | Taki | 30%–83% |
| 3,833,718 | 1974 | Chevron | 55% |
| 3,929,666 | 1975 | Taki | 30%–70% |
| 4,034,067 | 1977 | Degremont | 77%–90% |
| 4,051,028 | 1977 | Rhone-Poulenc | 77%–90% |
| 4,131,545 | 1978 | Laporte | 33%–80% |
| 4,238,347 | 1980 | Allied | 23%–50% |
| 4,362,643 | 1982 | Allied | 24%–67% |
| 4,390,445 | 1983 | Gytel | 33%–80% |
| 4,417,996 | 1983 | Allied | 24%–67% |

THE INVENTION

We have discovered a method of obtaining clarified waters by removing turbidity-causing components from these waters having an alkalinity of at least 100 ppm, as calculated as calcium carbonate, which comprises:

a. adding, at treatment temperatures above 35° F., to said waters an effective amount for the purpose of flocculating from turbid waters said turbidity-causing components of a low basicity polynuclear aluminum species with a basicity ranging between about 8.3% up to 33% and having the formula:

$$Al_n(OH)_m Z_{3n-m}$$

wherein, n is at least 1.0,
Z is a halide chosen from the group chloride, bromide, iodide, and mixtures thereof, and
wherein, the ratio of m/n ranges between about 0.25 to about 1.0 and at least 25 mole percent of the polynuclear aluminum species above has n equal to 2.0, and then, b. allowing sufficient time to form and build a floc dispersed in the treated water, which floc contains turbidity causing components, and then, c. phase separating the floc from the treated waters to obtain clarified waters.

Our method is improved if the polynuclear aluminum species has admixed with it prior to addition to said turbid waters, at least 1 weight percent, based on the total amount of polynuclear aluminum species, of a water-soluble cationic polymer.

The method is also improved wherein the polynuclear aluminum species has admixed with it before addition to the turbid waters at least 1 weight percent of a multivalent inorganic cationic species which may be present as a water-soluble salt. Similarly, this method is enhanced wherein the polynuclear aluminum species has admixed with it prior to the treatment of said turbid waters at least 1.0 weight percent of a multivalent inorganic anionic species, again sometimes present as a water-soluble inorganic salt.

Finally, the preferred results for treating turbid waters having a high alkalinity of at least 100 ppm, calculated as calcium carbonate, involves the treatment of said waters by adding thereto an effective amount for the purpose of flocculating said turbidity causing components of a low basicity polynuclear aluminum species having the formula:

$$Al_n(OH)_m Z_{3n-m}$$

wherein each letter is used as defined above, in the presence of at least 1 weight percent, based on polynuclear aluminum species, of a cationic water-soluble polymer and simultaneously in the presence of at least 1 weight percent of a multivalent inorganic species chosen from the group consisting of a multivalent cationic inorganic water-soluble salt, a multivalent anionic inorganic water-soluble salt, and mixtures thereof, such that both multivalent inorganic cationic species as well as multivalent inorganic anionic species are simultaneously present, each being present at a concentration of at least 1 weight percent based on the polynuclear aluminum compounds, and in the presence of at least 1 weight percent of the cationic water-soluble polymeric compound.

It is surprising to have determined that the basicity of the polynuclear aluminum compounds is not proportional to the product activity observed when used as a flocculant or coagulant for turbid waters as long as the water alkalinity of the turbid waters being treated is relatively high. It is surprising to find an optimal activity for polynuclear aluminum compounds dependent upon the alkalinity of the waters being treated. Alkalinity is normally measured as ppm calcium carbonate, and will be reported herein as such.

TURBIDITY-CAUSING COMPONENTS

By the term turbidity-causing components, we mean any organic or inorganic species of sufficient particle size to cause a turbid, light dispersion appearance in waste waters, industrial waters, natural waters, and the like. These turbidity-causing components can be of an inorganic nature, an organic nature, a color body, a pigment dispersion, a humate dispersion, a dispersion formed from animal wastes in waters used to collect these animal wastes, sewage components, or admixtures of any of the above in any ratio in waters of any description thereby obtaining a turbid translucent effect. Turbid waters is meant to generally describe any type of water described above having dispersed therein any type of turbidity-causing component, as described above, or any other type of turbidity-causing component which might be similar in effect when dispersed in these types of waters, such as for example colloidal matter of either organic or inorganic or even mixed organic and inorganic character.

ALKALINITY

Alkalinity is normally described as "M" alkalinity and is the total alkalinity as measured by the amount of acid required to neutralize all basic species present in an aqueous media to the methyl orange endpoint—about pH 4.2. A further definition of the term alkalinity is available in *The Nalco Water Handbook*, published by McGraw-Hill Book Company, copyright 1979, in the glossary on page G-1. Alkalinity is defined therein as "Alkalinity: by definition, total alkalinity (also called "M" alkalinity) is that which will react with acid as the pH of the sample is reduced to the methyl orange endpoint—about pH 4.2. Another significant expression is "P" alkalinity, which exists above pH 8.2 and is that which reacts with acid as the pH of the sample is reduced to a pH of 8.2."

The expression of alkalinity as being in terms of ppm calcium carbonate is accepted in the art and is the amount of alkalinity, as measured above, and calculated presuming that all of the alkalinity present in the titrated waters is present as calcium carbonate.

CATIONIC WATER-SOLUBLE POLYMERS

By the term cationic water-soluble polymers we mean to include any water-soluble polymer which carries or is capable of carrying a cationic charge when dissolved in water, whether or not that charge-carrying capacity is dependent upon pH. Such polymers include condensation polymers as well as polymers derived from vinyl monomers. As an example of successful use of these cationic polymers, the polymers obtained from the condensation reaction of epichlorohydrin and dimethylamine may be successfully used with the low-basicity polynuclear aluminum species of this invention. Other condensation polymers such as polymers obtained from the condensation of ethylene dichloride/ammonia, either in the presence or absence of substituted alkyl amines, may also be used effectively with these polynuclear aluminum species.

Vinyl polymers having water solubility and cationic characteristics, as described above, include modified polyacrylamides, modification being made, for example, by the typical Mannich reaction products or the quaternized Mannich reaction products known to the artesan, or other vinylic polymers which use as a vinyl monomer those monomers containing functional groups which have cationic character. As an example, but not meant to be limiting on this invention, we include in these types of vinyl monomers such monomers as DMAEM, DMAEM DMS quat., DACHA HCl, DADMAC, DMAEA, MAPTAC, AMPIQ, DEAEA, DEAEM, DMAEAcAm, DMAEMAcAm, DEAEAcAm, DEAEMAcAm, and ALA[1] the quaternized compounds containing these polymers, polymers containing diallyldimethylammonium chloride monomer, and the like. To be effective, these additive polymers, be they condensation polymers or vinyl polymers, must have a molecular weight of at least 2,000 and may have molecular weights exceeding 1,000,000. The preferred polymer is a condensation polymer derived from the reaction of epichlorohydrin and dimethylamine.

| | |
|---|---|
| [1]DMAEM = | Dimethylaminoethylmethacrylate |
| DMAEM DMS quat. = | Dimethylaminoethylmethacrylate quaternized with dimethyl sulfate |
| DACHA HCl = | Diallylcyclohexylamine hydrochloride |
| DADMAC = | Diallyl dimethyl ammonium chloride |
| DMAEA = | Dimethyl aminoethyl acrylate and/or its acid salts |
| MAPTAC = | Methacrylamidopropyl trimethyl ammonium chloride |
| AMPIQ = | 1-acrylamido-4-methyl piperazine (quaternized with MeCl, MeBr, or Dimethyl Sulfate) |
| DEAEA = | Diethylaminoethyl acrylate and/or its acid salts |
| DEAEM = | Diethylaminoethyl methacrylate and/or its acid salts |
| DMAEAcAm = | Dimethylaminoethyl acrylamide and/or its acid salts |
| DMAEMAcAm = | Dimethylaminoethyl methacrylamide and/or its acid salts |
| DEAEAcAm = | Diethyl aminoethyl acrylamide and/or its acid salts |
| DEAEMAcAm = | Diethyl aminoethyl methacrylamide and/or its acid salts |
| ALA = | Allyl amine |

When the cationic polymers are used, they are normally formulated such that the total treating agent contains at least 1.0%, by weight, of the cationic polymer, based on the weight of polynuclear aluminum species contained therein. Preferably the cationic polymers are present at concentrations of between 2.5–10.0 weight percent, based on polynuclear aluminum species.

MULTIVALENT INORGANIC CATIONIC SPECIES

By the term multivalent inorganic cationic species we mean an inorganic cation having a valency of at least 2 which may be combined with the starting aluminum species which are used to form the polynuclear aluminum compounds of this invention or may be combined after these polynuclear aluminum species are formed. Combinations of these multivalent inorganic cationic species with the polynuclear aluminum species improves and enhances the performance of the polynuclear aluminum species in the application of this invention. As an example of these multivalent inorganic cationic species, we include those cationic compounds obtained from water-soluble salts containing the alkaline earth metals or various so-called transition metals. Specifically, these multivalent inorganic cationic species may be chosen from the group consisting of magnesium, calcium, barium, titanium, chromium, manganese, iron, cobalt, nickel, copper, zinc, cadmium, lead, bismuth, and the like. A preferred multivalent inorganic cationic species would be from the group calcium, magnesium, chromium, manganese, iron, cobalt, nickel and zinc. A most preferred inorganic cationic species would be chosen from the group consisting of magnesium, calcium, manganese, chromium and iron. These cationic species are preferably added to the reaction mixture during the formation of the polynuclear aluminum species. Although there is some evidence that waters containing excessive amounts of these cationic species, when treated with polynuclear aluminum compounds of this invention which have not been synthesized using these cationic species, still provide superior results because of the presence of these inorganic polynuclear cationic compounds. This would indicate that it is preferred to form the polynuclear aluminum species in the presence of these kinds of multivalent cationic inorganic species to have and observe the enhanced reactivities in regards to coagulation/flocculation activities in turbid waters. Again, when used, the inorganic cationic species is combined with the polynuclear aluminum species described herein such that the inorganic cationic species is present in at least 1.0 weight percent, based on polyaluminum species, of the treatment agent.

THE MULTIVALENT INORGANIC ANIONIC SPECIES

By the term multivalent anionic inorganic species we mean such a species that are derived from the use of sulfate salts, phosphate salts, chlorate salts, perchlorate salts, borate salts, bromate salts, and the like. Preferably the use of these multivalent inorganic anionic species is limited to sulfates and phosphates.

Again, as with the multivalent inorganic cationic species, it would appear that the inclusion of these inorganic anionic species is best made during the process of manufacture of the polynuclear aluminum compound. As before, the inorganic anionic species is preferably contained in the polynuclear aluminum flocculant-/coagulant treating agent at a concentration of at least 1.0 weight percent, preferably between 2-10 weight percent, based on polynuclear aluminum species in the treating agent.

PHASE SEPARATION

By phase separation we mean any means used to separate the floc phase or solid phase formed after treatment of turbid waters with the polynuclear aluminum compounds (PACS) or formulations of this invention from the liquid water phase of the treated waters (treated waters being those turbid waters to which has been added to PACS of this invention).

Phase separating may mean settling of floc and collection of overflow waters, as in a standard clarifier application, or it may mean filtration through paper filters, sand bed filters, membrane filters, or it may mean any combinations of the above.

Phase separation of floc from treated waters having the floc suspended therein therefore gives the operator of such a system a clarified water.

POLYNUCLEAR ALUMINUM SPECIES

Low basicity polynuclear aluminum species refers to those compounds described by the formula:

$$Al_n(OH)_m Z_{3n-m}$$

where the ratio of m to n ranges between about 0.25–1.0.

In the above formula, n is at least 1.0, Z is a halide chosen from the group chloride, bromide, iodide, and mixtures thereof, and wherein, the ratio of m/n ranges between about 0.25 to about 1.0 and at least 25 mole percent of the polynuclear aluminum species above has n equal to 2.0.

These low basicity polynuclear aluminum species are made by methods familiar to the artesan. These methods are modified so as to control the ratio of hydroxyl ion to aluminum ion in the ranges described above.

The most preferred method of manufacturing these low basicity polynuclear aluminum species is the controlled dissolution of alumina by hydrochloric acid solutions. Preferred procedures for manufacturing the low basicity polynuclear aluminum species are presented below:

EXAMPLE 1

487.4 grams of a 36% solution of hydrochloric acid (4.817 moles) and 169.2 grams of alumina trihydrate (1.07 moles) were heated slowly (2 hours) to 120° C. and then refluxed at 120°–123° C. for 32 hours in a one liter, 3 neck, round bottom pyrex glass flask equipped with a stirrer, condenser, and thermometer. The resulting solution was cooled and diluted with 239.4 grams of water. The product was 896 grams of a slightly hazy solution (29 NTU) of $Al(OH)_{0.75}(Cl)_{2.25}$ (12.18% as $Al_2O_3$).

EXAMPLE 2

To a series of 4 oz. glass jars equipped with Teflon-coated magnetic stirring bars was added: 74.65 grams (0.1783 moles) of the product of Example 1 plus either sodium sulfate of ammonium dihydrogen phosphate dissolved in water to make 129.9 grams of product (7.0% as $Al_2O_3$)

| Product | Solution Ex. 1 | $Na_2SO_4$ Grams | $NH_4H_2PO_4$ Grams | OH/Al Ratio | Multi-Valent Anion/Al |
|---------|----------------|------------------|---------------------|-------------|-----------------------|
| A | 74.65 | None | None | 0.75 | None |
| B | 74.65 | 3.17 | None | 0.75 | 0.125 |
| C | 74.65 | None | 2.56 | 0.75 | 0.125 |

EXAMPLE 3

To a series of 4 oz. glass jars equipped with Teflon-coated magnetic stirring bars was added, 44.05 grams of a 27.0% aqueous solution of aluminum chloride (0.08918 moles) plus 3.54 grams of sodium carbonate (0.03343 moles) dissolved in 8.3 grams of water plus either sodium sulfate or sodium dihydrogen phosphate dissolved in sufficient water to make 64.95 grams of final product (7.0% as $Al_2O_3$).

| Product | 27% $AlCl_3$ Solution | $Na_2SO_4$ Grams | $NaH_2PO_4$ Grams | OH/Al Ratio | Multi-Valent Anion/Al |
|---|---|---|---|---|---|
| D | 44.04 | None | None | 0.75 | None |
| E | 44.04 | 1.58 | None | 0.75 | 0.125 |
| F | 44.04 | None | 1.54 | 0.75 | 0.125 |

EXAMPLE 4

To a series of 4 oz. glass jars equipped with Teflon-coated magnetic stirring bars was added, 44.04 grams of 27.0% aqueous solution of aluminum chloride (0.08918 moles) plus 0.03343 moles of either calcium hydroxide, sodium carbonate, or magnesium oxide dispersed in a sufficient quantity of water to make 64.95 grams of product (7.0% as $Al_2O_3$).

| Product | 27% $AlCl_3$ Solution | $Ca(OH)_2$ Grams | $Na_2CO_3$ Grams | MgO Grams | OH/Al Ratio |
|---|---|---|---|---|---|
| G | 44.04 | 2.55 | None | None | 0.75 |
| D | 44.04 | None | 3.54 | None | 0.75 |
| H | 44.04 | None | None | 1.35 | 0.75 |

EXAMPLE 5

To a series of 4 oz. glass jars equipped with Teflon-coated magnetic stirring bars was added, 43.54 grams of a 27.3% $AlCl_3$ solution (0.08914 moles) plus ammonium dihydrogen phosphate or 85% phosphoric acid dissolved in water plus a varying amount of hydrated lime ($Ca(OH)_2$) dispersed in a sufficient quantity of water to make 64.95 grams of final product (7.0% as $Al_2O_3$).

| Product | 27.3% $AlCl_3$ Solution | $NH_4H_2PO_4$ Grams | $H_3PO_4$ Grams | $Ca(OH)_2$ Grams | OH/Al Ratio |
|---|---|---|---|---|---|
| J | 43.54 | 1.28 | None | 1.70 | 0.50 |
| K | 43.54 | 1.28 | None | 2.55 | 0.75 |
| L | 43.54 | None | 1.28 | 2.98 | 0.75 |
| M | 43.54 | None | 1.28 | 3.83 | 1.00 |

EXAMPLE 6

To a 750 gallon Hastelloy C Reactor was charged 6380.7 pounds of a 27.0% aqueous solution of aluminum chloride, 185.9 pounds of an 85% solution of phosphoric acid, and 431.7 pounds of hydrated lime ($Ca(OH)_2$) dispersed in 1001.7 pounds of water. Cooling was provided to maintain the temperature at or below 114° F. The mixture was then stirred at 110°–114° F. for 3 hours. 8000 pounds of hazy solution (47NTU) was formed. Approximately 4460 pounds of this product was removed from the reactor (i.e. Product N).

To the remaining 3540 pounds of the above product in the reactor was added 181.0 pounds of a 50% aqueous solution of an epichlorohydrin/dimethylamine polymer. The mixture was then stirred for 1 more hour at 110°–114° F. The final product was a slightly hazy solution of polyaluminum chloride (7.8% as $Al_2O_3$) with an OH/Al ratio of 0.75.

| Product | OH/Al Ratio | $Al_2O_3$ % | $PO_4$/Al Ratio | Ca/Al Ratio | R/Ro[1] (actives) vs Treatment A |
|---|---|---|---|---|---|
| Before Polyamine | 0.75 | 8.2 | 0.125 | 0.44 | 0.49 |
| After Polyamine | 0.75 | 7.8 | 0.125 | 0.44 | 0.44 |

[1]Dupage River, alkalinity = 254 ppm as $CaCO_3$

The effectiveness of the application of these low basicity polynuclear aluminum species to turbid waters to obtain clarified waters can be determined by using standard experimental techniques.

The flocculation or coagulation activity of various samples are evaluated using standard jar test procedures. In these procedures a turbid water is treated by adding thereto various concentrations of polynuclear aluminum containing treating agents while the admixture is slowly agitated (about 20–30 rpm agitator speed). After the treating agent has been added completely, a rapid mix stage is achieved at about 100 rpm agitator speed for a time period ranging between 2–5 minutes. Following this rapid mix stage, a slow mix stage follows at a 50 revolution per minute agitator speed for a period ranging between 10–15 minutes. After the slow mix stage has been completed, a quiescent, no-mix, settling period of 15 minutes is then allowed. After this settling time period, product performance is measured by measuring the turbidity of the waters remaining over the precipitated and settled flocculant/coagulant. Product performance is then compared using the measured turbidity of the treated waters versus treatment agent dosage curves. In all of the tests to be described later, this general procedure was followed. Exceptions to this procedure will be specifically outlined.

In addition, replacement ratio tests were run. The replacement ratio is a dimensionless number which compares results obtained with an experimental flocculant/coagulant with results obtained with a known flocculant/coagulant treatment agent. A low ratio, that is a replacement ratio below 1.0 is favorable, meaning that the experimental treatment agent is preferred to the standard, known treatment agent.

EXPERIMENTAL

Four separate waters obtained from locations in a western mountain state were tested. These locations are identified as locations A, B, C, and D. Table I contains an analysis of the waters that were tested in terms of alkalinity, total hardness, color in APHA units, and turbidity in terms of NTU. NTU is defined as Nephalometric Turbidity Units, as described in *The Nalco Water Handbook*, published by McGraw-Hill Book Company, 1st Edition, copyright 1979, page 4-18.

TABLE I

| RAW WATER CHARACTERISTIC | | | | |
|---|---|---|---|---|
| Water Source Characteristic | A | B | C | D |
| Alkalinity | 28 | 35 | 115 | 60 |
| Hardness (total) ppm | 33 | 44 | 223 | 66 |
| Color (APHA units) | 10 | 10 | 10 | 5 |
| NTU | 1.8 | 1.7 | 1.7 | 2.9 |

The comparison of the effect of low basicity, as measured by the ratio of OH to aluminum, is given in Table II for those waters at sources B and D in this same mountain state. In this case the replacement ratio was compared against a high basicity polynuclear aluminum species which also contained 5 weight percent of a cationic water-soluble polymer to enhance its performance. Please note that waters from sources B and D are low alkalinity, being below 100 ppm alkalinity (as CaCO₃).

TABLE II

THE EFFECT OF BASICITY ON ACTIVITY - "B" AND "D" R/Ro

| No. | OH/Al | B | D |
|---|---|---|---|
| 1 | 0.75 | — | — |
| 2 | 0.75 | 1.86 | — |
| 3 | 1.00 | 1.60 | — |
| 4 | 1.25 | 1.52 | 1.46 |
| 5 | 1.25 | — | 1.81 |
| 6 | 1.50 | 1.13 | — |
| 7 | 1.50 | 1.25 | — |
| 8 | 1.88 | 0.93 | 1.24 |
| 9 | 1.88 | 0.84 | 0.92 |

As can be seen from these results, the performance as measured by the replacement ratio, R/Ro, demonstrates that the use of a higher basicity polynuclear aluminum species improves clarification in these low alkalinity waters.

In other words, the importance of a relationship between polynuclear aluminum product basicity and raw water alkalinity in regards to the polynuclear aluminum species coagulation activity cannot be demonstrated when using low alkalinity waters. However, when treating high alkalinity waters there is no direct relationship between polynuclear aluminum compound product activity as is reflected by the replacement ratio and the basicity of the product. Instead, it is surprising to find an optimal activity for polynuclear aluminum compounds dependent upon the alkalinity of the waters being treated. The existence of this optimal activity suggests that the most active aluminum species in these coagulation/flocculation applications are those species which are formed in situ through hydrolysis by waters having an alkalinity above 100 ppm, calculated as calcium carbonate.

The rate of these aluminum species hydrolysis reactions would appear to be effected by the amount of alkalinity in the water being treated. Under conditions of very high alkalinity the polynuclear aluminum product having a hydroxyl/aluminum value of 0.75 can hydrolyze quickly enough so as to display the best activity of all polynuclear aluminum products. At a hydroxyl/aluminum ratio less than 0.75, the rate of these reactions probably becomes relatively slow when compared to the rate of the coagulation/flocculation process itself. We speculate that at ratios of hydroxyl/aluminum considerably greater than about 0.75 the competition between the hydrolysis reaction and the flocculation/coagulation reaction would provide less opportunity for in situ hydrolysis reactions to occur since the product applied in that type of water would have experienced more pre-neutralization. This explains the observed decrease in activity.

This proposed mechanism is consistent with the observations appearing in the prior art which indicated that high basicity polynuclear aluminum species having high molecular weight appear most active in treating waste waters.

The test sequence in regards to the waters of source C, which have an alkalinity exceeding 100 ppm and are therefore classified as high alkalinity water, indicated improved product performance proceeding from a hydroxyl/aluminum ratio from 0.75 to about 1.50.

Waters used to test the low basicity polynuclear aluminum compounds of this invention were taken from the DuPage River of northern Illinois. Complete analysis of this water is given in the Table V. As can be seen, the analysis is at different times of the year and represents a fairly good average of the character of this water. Please note that in all cases, regardless of the time of the year the water was sampled and analyzed, the water alkalinity always exceeded 100 ppm, and most likely exceeded 250 ppm as CaCO₃.

To better demonstrate our invention, the following tables and graphs are presented. In these tables and graphs, the waters being treated are obtained from the DuPage River in northern Illinois. Several samples of this water were obtained at different times and the results of these analyses are presented below:

BRIEF DESCRIPTIONS OF THE FIGURES

To better illustrate the optimums found for the treatment of high alkalinity waters by low basicity polynuclear aluminum compounds, FIGS. 1-5 are presented.

FIG. 1 demonstrates the optimum coagulation activity for polynuclear aluminum complexes in high alkalinity waters taken from the DuPage River in northern Illinois. As can be observed, the optimum activity occurs when the polynuclear aluminum complex coagulant has an OH/Al ratio ranging between about 0.5 and 1.00. This relationship holds true regardless of starting materials used to manufacture the polynuclear aluminum compounds. However, additional ingredients also affect the overall activities of these compounds. The activities observed are presented as a replacement ratio relative to "Treatment A".

Figure 2:
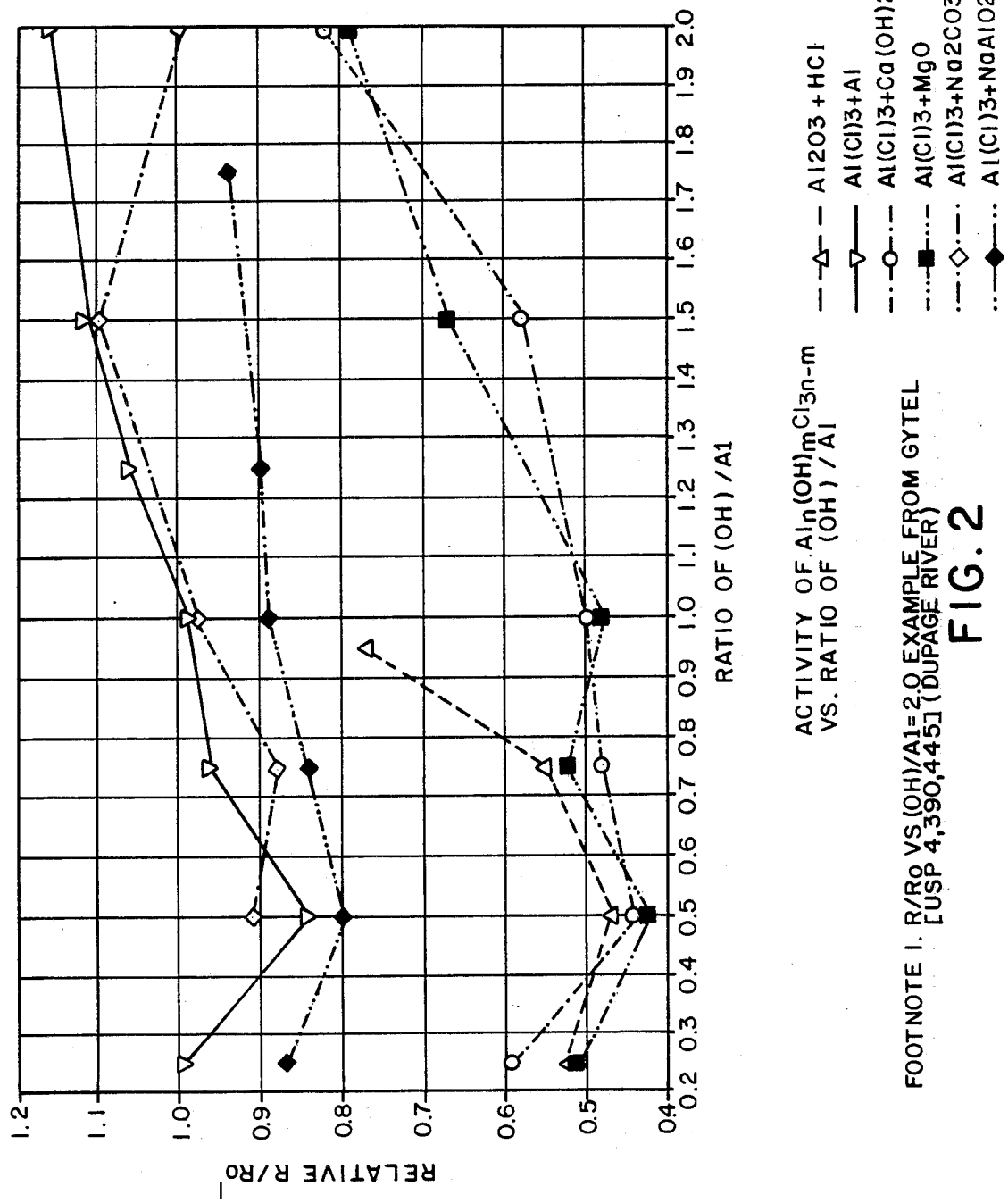

FIG. 2 represents data similar to that plotted in FIG. 1, however comparison in this case is made against a polyaluminum chloride having an OH/Al ratio equal to 2.00, which polyaluminum chloride is similar to the one discussed in the Gytel Patent, U.S. Pat. No. 4,390,445. As can again be observed, the replacement ratios are most favorable when using the invention claimed herein.

Again, the waters used in all of these tests came from the DuPage River.

Figure 3:
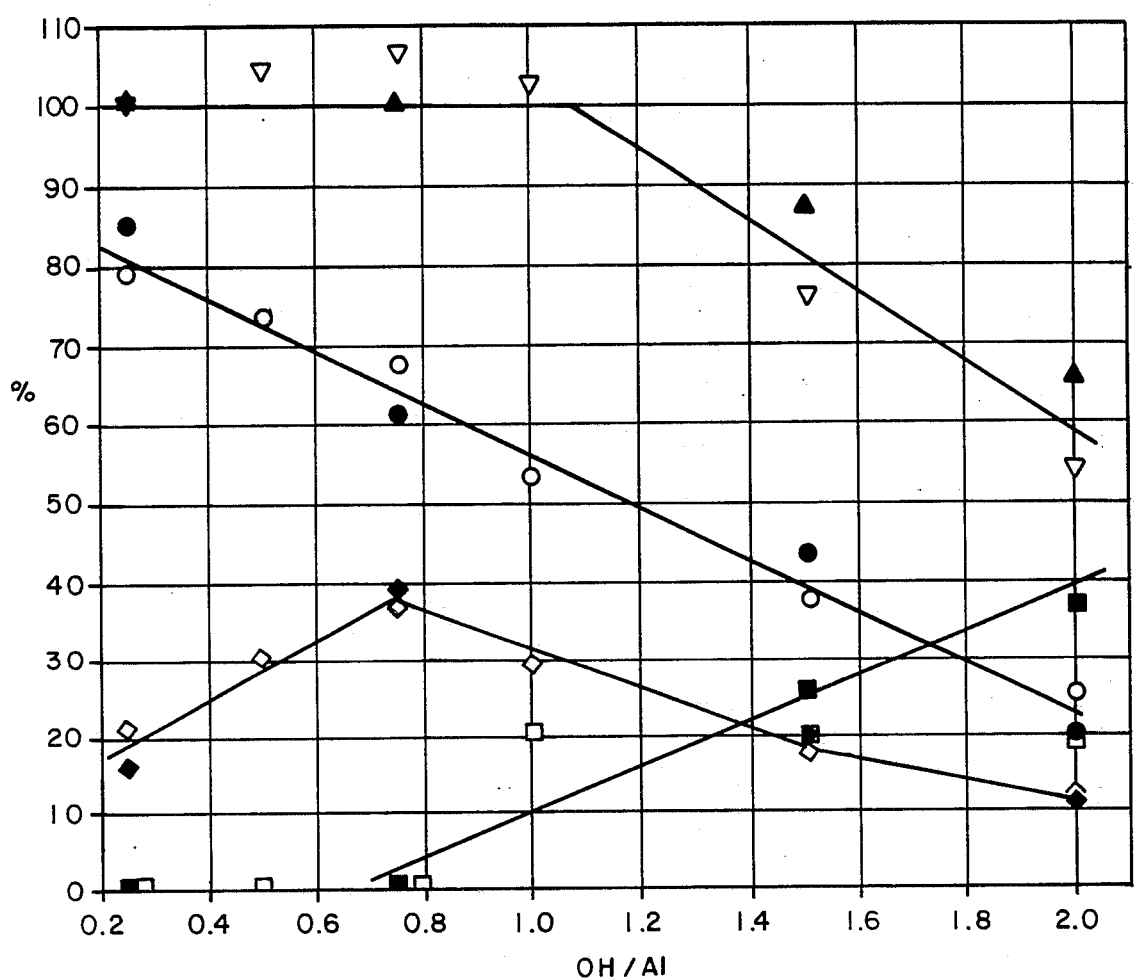

FIG. 3 demonstrates that in addition to the optimum coagulation activity as displayed in FIGS. 1 and 2 with polynuclear aluminum species having an OH/Al ratio ranging between about 0.5-1.00, there is also coincident thereto a maximum polynuclear aluminum dimer concentration at that same OH/Al ratio. The data displayed in FIG. 3 are obtained from $^{27}$Al NMR (Nuclear Magnetic Resonance Spectroscopy). These data demonstrate the change in concentration for the monomeric, dimeric, and polymeric species and polymeric polynuclear species as the OH/Al ratio changes. Also, FIG. 3 includes a summation of these three species which shows that for a hydroxyl/aluminum ranging between about 0.25 to about 1.1, the percentage of these species are additive to 100 percent. However, after this ratio exceeds about 1.1, the accountable materials measured by this NMR technique drop below 100 percent only because the higher polymeric species are tranparent to the NMR detection device. It is clear from the results illustrated in FIG. 3 that as the dimer species maximizes, the activity of these low basicity polynuclear aluminum compounds in the treatment of high alkalinity waters also maximizes.

Figure 4:
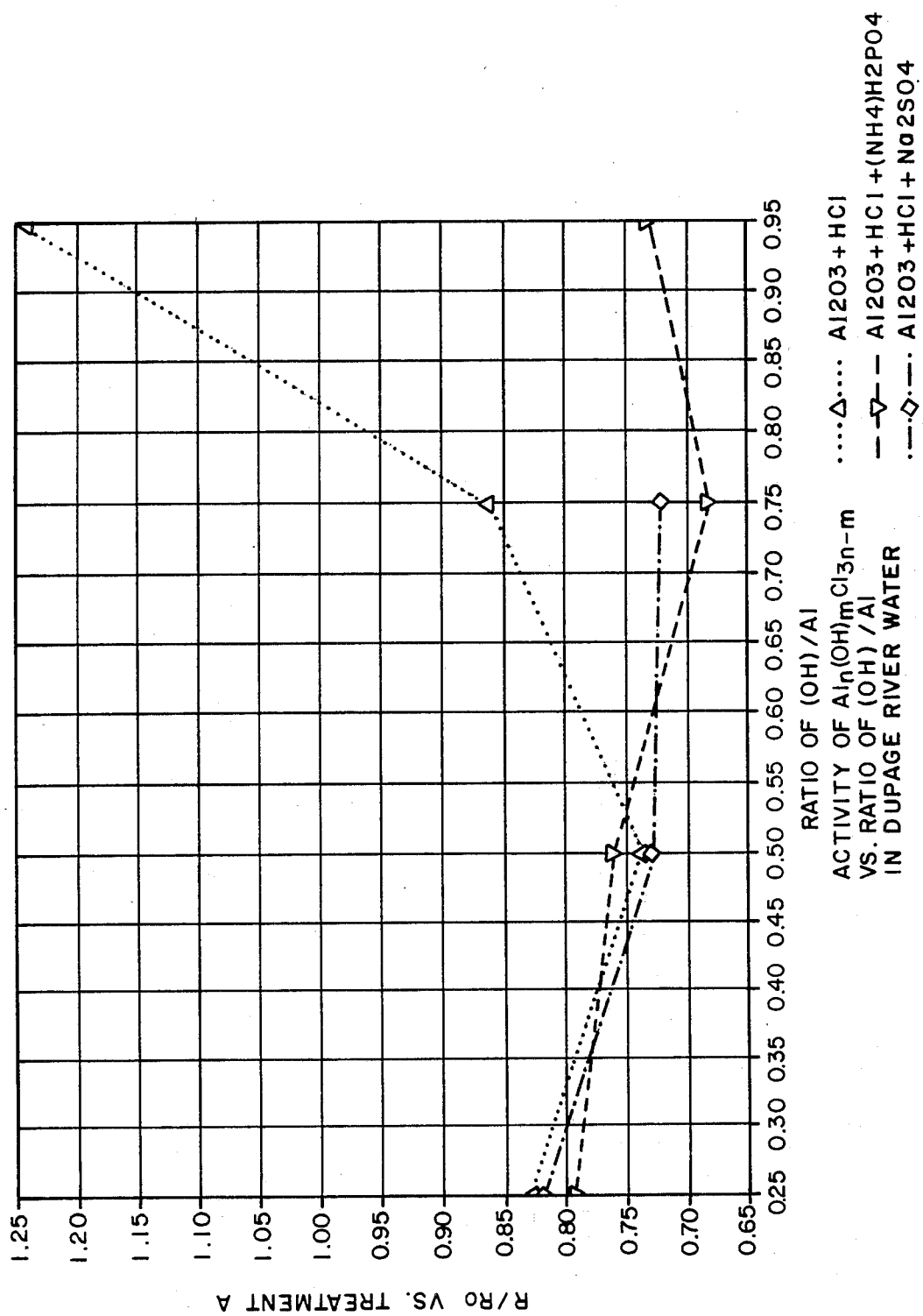

FIG. 4 demonstrates that polynuclear aluminum compounds having hydroxyl/aluminum ratios between about 0.5–1.00 can be improved in their activities by the addition of polyvalent anions such as sulfates and/or phosphates. The inclusion of these polyvalent anions enhances the activity of polynuclear aluminum compounds having the hydroxyl/aluminum ratios of the preferred invention.

Figure 5:
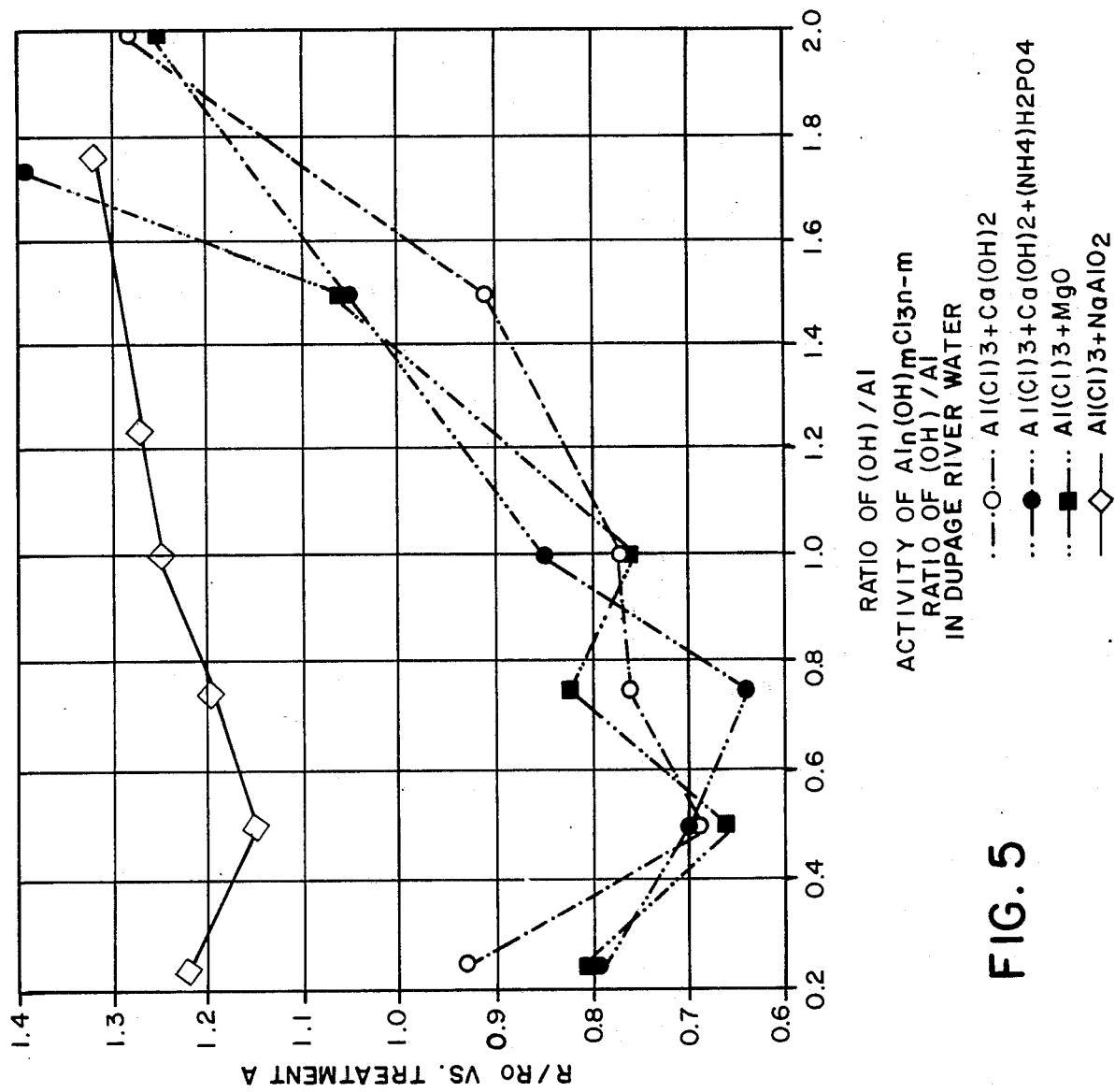

FIG. 5 demonstrates graphically that the presence of multivalent anions and multivalent cations each individually improved the coagulation activity of polynuclear aluminum species, particularly when these species have a hydroxyl/aluminum ratio ranging between about 0.5–1.0. FIG. 5 also demonstrates that the maximum improved activity is observed when both multivalent anions and multivalent cations are present with the polynuclear aluminum species, again particularly when these species have a hydroxyl/aluminum ratio ranging between about 0.5–1.0.

TABLE III
EFFECT OF BASICITY OF PAC ON ACTIVITY

| $Al_2O_3$ % | $SO_4/Al$ RATIO | $H_3PO_4/Al$ RATIO | RAW MATERIALS | OH/Al RATIO | pH | $R/Ro^1$ vs TAKI$^2$ | High Basicity Treatment C$^3$ |
|---|---|---|---|---|---|---|---|
| 7 | 0.125 | 0.000 | $Al_2O_3$ + 4.5 HCl | 0.750 | 2.40 | 0.66 | 0.91 |
| 7 | 0.125 | 0.000 | $Al_2O_3$ + $Na_2CO_3$ | 1.000 | 2.55 | 0.76 | 0.92 |
| 7 | 0.125 | 0.000 | $Al_2O_3$ + $Na_2CO_3$ | 1.250 | 2.80 | 0.72 | 0.91 |
| 7 | 0.125 | 0.000 | $Al_2O_3$ + $Na_2CO_3$ | 1.500 | 3.05 | 0.77 | 0.92 |
| 7 | 0.125 | 0.000 | $Al_2O_3$ + $Na_2CO_3$ | 1.875 | 3.15 | 0.80 | 0.97 |
| 7 | 0.125 | 0.000 | $Al_2O_3$ + $Na_2CO_3$ | 2.250 | Gelled | | |
| 7 | 0.000 | 0.125 | $Al_2O_3$ + 4.5 HCl | 0.750 | 2.55 | 0.79 | 0.73 |
| 7 | 0.000 | 0.125 | $Al_2O_3$ + $Na_2CO_3$ | 1.000 | 2.75 | 0.77 | |
| 7 | 0.000 | 0.125 | $Al_2O_3$ + $Na_2CO_3$ | 1.250 | 2.85 | 0.75 | |
| 7 | 0.000 | 0.125 | $Al_2O_3$ + $Na_2CO_3$ | 1.500 | 3.00 | 0.73 | 0.85 |
| 7 | 0.000 | 0.125 | $Al_2O_3$ + $Na_2CO_3$ | 1.875 | 3.15 | 0.86 | 0.93 |
| 7 | 0.000 | 0.125 | $Al_2O_3$ + $Na_2CO_3$ | 2.250 | gelled | | |
| 7 | 0.000 | 0.000 | $Al_2O_3$ + 4.5 HCl | 0.750 | 2.50 | 0.73 | 0.98 |
| 7 | 0.000 | 0.125 | $Al_2O_3$ + $Ca(OH)_2$ | 1.000 | 2.60 | 0.83 | |
| 7 | 0.000 | 0.125 | $Al_2O_3$ + $Ca(OH)_2$ | 1.250 | 2.75 | 0.83 | |
| 7 | 0.000 | 0.125 | $Al_2O_3$ + $Ca(OH)_2$ | 1.500 | 2.85 | 0.74 | |
| 7 | 0.000 | 0.125 | $Al_2O_3$ + $Ca(OH)_2$ | 1.875 | 2.95 | 0.72 | 0.87 |
| 7 | 0.000 | 0.125 | $Al_2O_3$ + $Ca(OH)_2$ | 2.250 | gelled | | |

[1]R/Ro = Replacement ratio calculated on "active" basis
[2]TAKI = A sample obtained from TAKI Company which contained high basicity polynuclear aluminum compound combined with sulfate anion.
[3]Treatment C = High basicity PAC

TABLE IV
BASICITY SERIES FROM AlCl$_3$ PLUS VARIOUS BASES OR Al$_2$O$_3$ OR ALUMINUM

| $Al_2O_3$ % | Raw MATERIALS | OH/Al RATIO | PH | $R/Ro^1$ vs Treatment A$^2$ | $R/Ro^2$ vs Treatment B$^3$ |
|---|---|---|---|---|---|
| 7 | $AlCl_3$ + $Ca(OH)_2$ | 0.25 | 1.35 | 0.83 | 0.59 |
| 7 | $AlCl_3$ + $Ca(OH)_2$ | 0.50 | 1.45 | 0.62 | 0.44 |
| 7 | $AlCl_3$ + $Ca(OH)_2$ | 0.75 | 1.55 | 0.68 | 0.48 |
| 7 | $AlCl_3$ + $Ca(OH)_2$ | 1.00 | 1.90 | 0.69 | 0.49 |
| 7 | $AlCl_3$ + $Ca(OH)_2$ | 1.50 | 2.10 | 0.82 | 0.58 |
| 7 | $AlCl_3$ + $Ca(OH)_2$ | 2.00 | 2.50 | 1.15 | 0.82 |
| 7 | $AlCl_3$ + $Na_2CO_3$ | 0.25 | 1.35 | 1.12 | 0.79 |
| 7 | $AlCl_3$ + $Na_2CO_3$ | 0.50 | 1.50 | 1.29 | 0.91 |
| 7 | $AlCl_3$ + $Na_2CO_3$ | 0.75 | 1.65 | 1.24 | 0.88 |
| 7 | $AlCl_3$ + $Na_2CO_3$ | 1.00 | 2.00 | 1.38 | 0.98 |
| 7 | $AlCl_3$ + $Na_2CO_3$ | 1.50 | 2.35 | 1.55 | 1.10 |
| 7 | $AlCl_3$ + $Na_2CO_3$ | 2.00 | 2.55 | 1.41 | 1.00 |
| 7 | $AlCl_3$ + MgO | 0.25 | 1.40 | 0.72 | 0.51 |
| 7 | $AlCl_3$ + MgO | 0.50 | 1.65 | 0.59 | 0.42 |
| 7 | $AlCl_3$ + MgO | 0.75 | 1.75 | 0.74 | 0.52 |
| 7 | $AlCl_3$ + MgO | 1.00 | 1.85 | 0.68 | 0.48 |
| 7 | $AlCl_3$ + MgO | 1.50 | 2.10 | 0.95 | 0.67 |
| 7 | $AlCl_3$ + MgO | 2.00 | 2.50 | 1.12 | 0.79 |
| 9 | $AlCl_3$ + $NaAlO_2$ | 0.25 | 0.75 | 1.23 | 0.87 |
| 9 | $AlCl_3$ + $NaAlO_2$ | 0.50 | 1.15 | 1.13 | 0.80 |
| 9 | $AlCl_3$ + $NaAlO_2$ | 0.75 | 1.45 | 1.19 | 0.84 |
| 9 | $AlCl_3$ + $NaAlO_2$ | 1.00 | 1.75 | 1.26 | 0.89 |
| 9 | $AlCl_3$ + $NaAlO_2$ | 1.25 | 2.05 | 1.27 | 0.90 |
| 9 | $AlCl_3$ + $NaAlO_2$ | 1.50 | 2.30 | | |
| 9 | $AlCl_3$ + $NaAlO_2$ | 1.75 | 2.60 | 1.33 | 0.94 |
| 7 | $Al_2O_3$ + 5.5 HCl | 0.25 | 1.45 | 0.74 | 0.52 |
| 7 | $Al_2O_3$ + 5 HCl | 0.50 | 1.65 | 0.66 | 0.47 |
| 7 | $Al_2O_3$ + 4.5 HCl | 0.75 | 2.50 | 1.23 | 0.87 |
| 7 | $Al_2O_3$ + 4.5 HCl | 0.75 | 2.15 | 0.77 | 0.55 |
| 10 | $Al_2O_3$ + 4 HCl | 0.95 | 2.65 | 1.09 | 0.77 |
| 10 | $Al_2O_3$ + 4 HCl | 0.95 | 2.65 | 1.12 | 0.79 |
| 10 | $AlCl_3$ + Al | 0.25 | 0.70 | 1.40 | 0.99 |
| 10 | $AlCl_3$ + Al | 0.50 | 1.20 | 1.19 | 0.84 |
| 10 | $AlCl_3$ + Al | 0.75 | 1.50 | 1.35 | 0.96 |
| 10 | $AlCl_3$ + Al | 1.00 | 1.85 | 1.38 | 0.98 |
| 10 | $AlCl_3$ + Al | 1.25 | 2.15 | 1.49 | 1.06 |
| 10 | $AlCl_3$ + Al | 1.50 | 2.40 | 1.56 | 1.11 |
| 10 | $AlCl_3$ + Al | 2.00 | 2.85 | 1.63 | 1.16 |
| 14 | $AlCl_3$ + Al | 2.25 | 3.00 | | |

[1]R/Ro = Replacement ratio, actives basis.
[2]Treatment A = High basicity PAC, containing 5% (wt/wt) cationic polymer
[3]Treatment B as in GYTEL, 4,390,445

TABLE V
WATER ANALYSIS - DUPAGE RIVER WATER

| | Date | | |
|---|---|---|---|
| | Aug. 7, 1984 TOTAL PPM | Dec. 5, 1984 TOTAL PPM | May 16, 1985 TOTAL PPM |
| CATIONS | | | |
| Calcium | 210 | 220 | 200 |
| Magnesium | 160 | 160 | 150 |
| Sodium | 340 | 250 | 280 |
| Antimony | — | — | 0.1 |
| Barium | 0.3 | 0.2 | 0.6 |
| Potassium | 10 | 6.9 | 7.7 |
| Thallium | 0.5 | 0.4 | 0.6 |
| Chromium | 0.4 | 0.06 | 0.8 |
| Cobalt | 0.2 | — | 0.02 |
| Copper | 0.03 | 0.08 | — |
| Iron | 3.2 | 0.33 | 3.3 |
| Manganese | 0.14 | 0.02 | 0.16 |
| Strontium | 0.99 | 0.69 | 0.84 |
| Titanium | 0.04 | — | 0.04 |
| Vanadium | 0.02 | 0.01 | 0.02 |

TABLE V-continued
WATER ANALYSIS - DUPAGE RIVER WATER

| | Date | | |
|---|---|---|---|
| | Aug. 7, 1984 TOTAL PPM | Dec. 5, 1984 TOTAL PPM | May 16, 1985 TOTAL PPM |
| Zinc | 0.12 | 0.03 | 0.07 |
| Zirconium | 0.01 | 0.01 | 0.02 |
| Lead | <0.05 | <0.05 | 0.07 |
| Ammonia | — | — | — |
| ANIONS | | | |
| Bicarbonate Alkalinity | 252 | 254 | 218 |
| Boron | 0.5 | 0.3 | 0.4 |
| Phosphorus | 2.1 | 1.3 | 1.9 |
| Silica | 12 | 11 | 9.9 |
| Sulfur | 45.0 | 42 | 36 |
| Fluoride | 0.92 | 0.73 | 1.2 |
| Chloride | 290 | 230 | 260 |
| Sulfate | 130 | 110 | 110 |
| Nitrate | 17 | 16 | 16 |
| Nitrite | 0.7 | <0.1 | <1.0 |
| Phosphorus-Sol. Orth & Poly | 2.5 | — | — |
| Phosphorus-Sol. Orthophosphate | 2.5 | — | — |
| Silica-Molybdate Reactive | 11 | 10 | 9.6 |
| OTHERS | | | |
| Ph | 7.6 | 7.8 | 7.1 |

As can be seen in the data presented in Tables III, IV, and V, inclusion of ether inorganic cationic species or inorganic anionic species with the low basicity polyaluminum chloride (PACS) above provides improved results. All of the waters treated above were waters obtained from the DuPage River in Northern Illinois, and although alkalinity varied somewhat from sample to sample, the alkalinity normally ranged between about 100 ppm up to about 500 ppm, as $CaCO_3$, (averaged about 250 ppm as $CaCO_3$) and the turbidity of these waters, prior to treatment ranged between about 10 to about 50 NTU, with most samples having a turbidity between about 15–40 NTU (as defined above).

In addition to the data in the Tables above, other data demonstrate that the low basicity polyaluminum chloride salts (PACS) having a basicity of 16.7% up to 33% (OH/Al=0.5 TO 1.0) are up to twice as effective as conventional higher basicity PACS (OH/Al=1.62 or 54% basicity) when used for clarification of low turbidity waters (NTU from 10–50 NTU) which have moderate to high alkalinity (i.e. greater than 100 ppm as $CaCO_3$).

FIG. 1 illustrates that PACS made by various reactions were most effective for clarification of DuPage River water (250 ppm as $CaCO_3$) when the OH/Al ratio was 0.5 to 0.75.

Low basicity PACS made by reacting aluminum chloride with alumina, lime, magnesia, sodium carbonate, or sodium aluminate, were each most effective when the OH/Al ratio was 0.5 to 0.75 (FIG. 2).

FIG. 3 illustrates that a low-basicity polynuclear aluminum species containing a maximized concentration of an aluminum dimer, wherein the dimer is present at a maximum concentration of 40% (of Al) and has a OH/Al ratio of 0.75, is apparently a more active coagulant in these moderate to high alkalinity waters. The total amount of aluminum polymer (dimer included) as measured by NMR (nuclear magnetic resonance) continues to increase as the OH/Al ratio is increased.

FIGS. 4 and 5 illustrate improved performance in high alkalinity waters of a low basicity polynuclear aluminum species having combined therewith anionic inorganic species (FIG. 4) and a combination of inorganic cations and anions (FIG. 5).

Having thus described my invention, I claim:

1. A method of clarifying waters containing turbidity causing components and having an alkalinity of at least 115 ppm, calculated as $CaCO_3$, which comprises:
   a. Adding thereto, to form a treated water, an effective amount for the purpose of clarifying said waters of a low-basicity polynuclear aluminum species with a basicity ranging between about 8.3% up to 33% and having the formula:

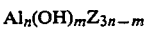

$$Al_n(OH)_m Z_{3n-m}$$

wherein, n is at least 1.0
   Z is a halide chosen from the group chloride, bromide, iodide, and mixtures thereof, and
   wherein the ratio of m/n ranges between about 0.25 to about 1.0 and at least 25 mole percent of the polynuclear aluminum species above has n equal to 2.0, and then,
   b. Allowing sufficient time to form and build a floc dispersed in the treated water, which floc contains turbidity causing components, and then,
   c. Phase separating the floc from the treated waters to obtain clarified water.

2. The method of claim 1 wherein the polynuclear aluminum species has admixed with it at least 1.0 weight percent, based on the weight of polynuclear aluminum species present, of a water-soluble cationic polymer.

3. The method of claim 2 wherein the polynuclear aluminum species has admixed with it at least 1.0 weight percent of the cationic polymer and also has admixed with it at least 1.0 weight percent each of a multi-valent inorganic species chosen from the group consisting of a multi-valent inorganic cationic species, a multi-valent inorganic anionic species, and mixtures thereof, with the proviso that in admixing the polynuclear aluminum species with any or all of the multi-valent inorganic species above, no precipitates are formed.

4. The method of claim 3 wherein the inorganic anionic species are chosen from sulfate, phosphate, and mixtures thereof, and the inorganic cationic species is chosen from the group magnesium, calcium, iron, manganese, chromium, and mixtures thereof.

5. The method of claim 2 wherein the water-soluble cationic polymer is a condensation polymer of epichlorohydrin and dimethylamine and has a molecular weight of at least 2000.

6. The method of claim 2 wherein the water-soluble cationic polymer is a vinylic polymer containing at least 10 mer percent of a cationic monomer chosen from the group consisting of;
Allyl amine,
Dimethylaminoethylmethacrylate,
Dimethylaminoethylmethacrylate quaternized with dimethyl sulfate,
Diallylcyclohexylamine hydrochloride,
Diallyl dimethyl ammonium chloride,
Dimethyl aminoethyl acrylate and/or its acid salts,
Methacrylamidopropyl trimethyl ammonium chloride,
1-acrylamido-4-methyl piperazine (quaternized with MeCl, MeBr, or Dimethyl Sulfate),
Diethylaminoethyl acrylate and/or its acid salts,
Diethylaminoethyl methacrylate and/or its acid salts, Dimethylaminoethyl acrylamide and/or its acid salts,
Dimethylaminoethyl methacrylamide and/or its acid salts,
Diethyl aminoethyl acrylamide and/or its acid salts,
Diethyl aminoethyl methacrylamide and/or its acid salts, and mixtures thereof.

7. The method of claim 1 wherein the polynuclear aluminum species has admixed with it at least 1.0 weight percent, based on the weight of polynuclear aluminum species present, of a multi-valent inorganic anionic species.

8. The method of claim 7 wherein the multi-valent inorganic anionic species is chosen from the group consisting of sulfate, phosphate, and mixtures thereof.

9. The method of claim 1 wherein the polynuclear aluminum species has admixed with it at least 1.0 weight percent, based on the weight of polynuclear aluminum species present, of a multi-valent inorganic cationic species chosen from the group consisting of magnesium, calcium, manganese, and mixtures thereof.

* * * * *